United States Patent [19]

Grafström et al.

[11] Patent Number: 5,119,446
[45] Date of Patent: Jun. 2, 1992

[54] SEALED SPHERICAL ROLLING BEARING

[75] Inventors: Gunnar Grafström, Floda; Bengt Engström, Mölnlycke, both of Sweden

[73] Assignee: AB SKF, Goteborg, Sweden

[21] Appl. No.: 684,031

[22] Filed: Apr. 11, 1991

[30] Foreign Application Priority Data

Apr. 18, 1990 [SE] Sweden .................. 9001373

[51] Int. Cl.⁵ ............................................. F16C 33/78
[52] U.S. Cl. ..................... 384/484; 384/477; 384/497
[58] Field of Search ............... 384/484, 485, 486, 497, 384/477, 558

[56] References Cited

U.S. PATENT DOCUMENTS

| | | | |
|---|---|---|---|
| 2,919,942 | 1/1960 | Bechtel | 384/497 |
| 4,512,672 | 4/1985 | Olschewski et al. | 384/486 |
| 4,872,770 | 10/1989 | Dickinson | 384/484 |
| 5,042,822 | 8/1991 | Dreschmann et al. | 384/486 |

Primary Examiner—Lenard A. Footland
Attorney, Agent, or Firm—Eugene E. Renz

[57] ABSTRACT

The invention relates to a spherical rolling bearing which comprises an outer ring with a spherical race track, an inner ring, a plurality of rolling elements between the rings, and seals on one or both sides of the rolling elements. The invention is characterized in that the seals are formed with a rim which can be snapped against the spherical race track and kept in an outer ring by means of this rim and a portion which clamps against the side plane of the outer ring. By this design there is no need for the outer ring to be provided with grooves for holding the seals.

4 Claims, 3 Drawing Sheets

SEALED SPHERICAL ROLLING BEARING

FIELD OF THE INVENTION

The present invention relates to sealed spherical rolling bearings comprising both ball and roller bearings.

BACKGROUND OF THE INVENTION

Spherical bearings in general are not sealed, since they are usually mounted in some form of a bearing housing, whereby it is sufficient to seal the area where the shaft passes through the housing wall. However, sealed spherical bearings are commonly known. A problem with sealing of spherical bearings is that the sealing action of the seals are affected by the tilting of the bearing. The seal area on one side can be pressed harder against a contact surface while the seal area on the other side might have a loose contact depending on the degree of tilt. A seal being pressed too hard against a corresponding contact surface does not naturally degrade the sealing action in itself. However, this condition usually results in an unnecessarily high and undesirable friction. The contact between the seal and the corresponding contact surface becoming too loose does, of itself, naturally degrade the sealing action. Special designs of the seals for the spherical bearings therefore have been developed which withstand tilting of the bearing without increasing friction or degrading the sealing action.

The seals in spherical bearings are generally mounted on the outer ring, either in a groove on the side surface of the outer ring, or in a groove at the inner surface of the outer ring adjacent the spherical raceway path. If the groove is positioned on the side surface of the outer ring, the seal will mostly lie outside the bearing and a problem will arise when the bearing is mounted, since the side wall is occupied by the seal. During the mounting of the bearing, one has to consider that there has to be a space for the seal on the outside of the bearing. However, this is not a great problem.

When there is no space to permit mounting the seal outside the bearing then the seal must be mounted in a groove in the inner surface of the outer ring as discussed above. The bearing rings however, will be much broader than that required for the carrying capacity, since there has to be additional space inside the bearing, beside the roller elements, for the seals.

SUMMARY OF THE INVENTION

The present invention provides a solution to the problems of previously known sealed spherical rolling bearings. To this end, in accordance with the present invention, the bearing comprises an outer ring having a spherical running path, an inner ring, roller elements between the rings, and seals on one or both sides. The seals are designed with a rim which can be snapped into the spherical running path and clamped in the outer ring by means of this rim, and a portion which clamps towards the side plane of the outer ring.

According to the present invention, it is suitable to make the seal in one piece of plastic, rubber or sheet metal which can be bent at its radial inner rim inwardly against the bearing and forms a labyrinth seal against a surface of the inner ring.

According to the present invention the seal can also be in two pieces. One piece, the radially outer part, being made of plastic or sheet metal, and the other piece, the radially inner part, may consist of a lip of rubber, or similar soft material, adapted to contact a surface on the inner ring.

According to a further embodiment of the present invention, the seal extends only partly towards the inner ring. A lip of soft material mounted on the inner ring extends towards and contacts the outside of the seal.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
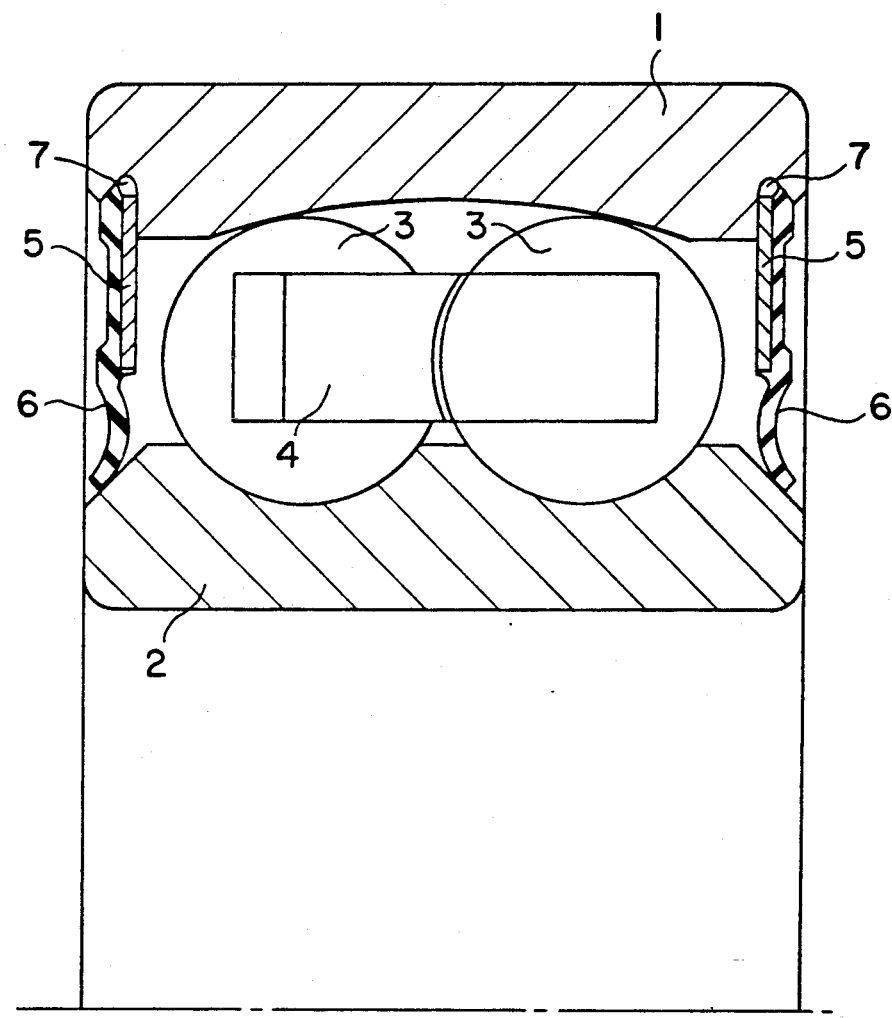
FIG. 1 in section shows a conventional type sealed double row spherical ball bearing.

Referring now to the drawings and particularly to FIG. 1 thereof, there is illustrated a conventional type sealed spherical bearing. The sealed spherical bearing comprises an outer ring 1, an inner ring 2, balls 3, a retainer 4 and seals 5 on each side of the balls 3. The seals 5, which consist of an inner sheet of vulcanized rubber, and with a sealing lip 6, are pressed into spherical running path or grooves 7 in the outer ring 1. As is evident from FIG. 1, the part of the bearing which is outside the running paths 7, constitutes a very large part of the width of the bearing, about twenty-five percent (25%), which does not contribute to the load carrying capacity of the bearing. If the seals were not needed, a much narrower bearing could therefore be used with the same load carrying capacity. One should be able to save both material and large machining costs, especially as it relates to the turning of the grooves 7.

In accordance with the present invention, there is provided a sealed bearing which has the same width as an unsealed bearing without grooves for seals. It has been found, that beside the roller elements in unsealed bearings, there is also a small space for seals mounted outside the bearing. However, these seals are not allowed to project too far radially beyond the outer ring and have to be fixed in this region near the spherical inside surface thereof. The reason for this is that it should be possible to lock the outer ring with a step, washers, or the like, which engage the side plane of the ring.

Therefore, in accordance with the present invention, seals 8 are provided with a rim 9 having an inner peripheral edge 9a near the radially outer part of the seal. The rim 9 is intended to be snapped in against the spherical race track 10 of the bearing. In order to securely clamp the seal, the outer part 11 of the seal 8 is formed such that it presses against the side plane 12 of the outer ring 1. In this way, the seal 8 is seated securely. The rim 9 is preferably somewhat elastic to facilitate mounting of the seal. It is therefore suitable if either the whole outer part of the seal 8, or only the rim 9, is made of an elastic material such as rubber, plastic or metal sheet. A further advantage of the rim 9 is that it is clamped by the balls 3 when the bearing is tilted, so that the seal 8 is not pressed out of the bearing. Without the rim 9, the seal 8 may easily be pressed out of the bearing during the handling of the bearing before assembly. The whole seal 8 can be made in one and the same material and it may, such as is shown in FIG. 2, have a radially inner part 13, which is bent inwardly against the inner ring 2 and which forms a labyrinth seal against the inner ring 2.

Figure 2:
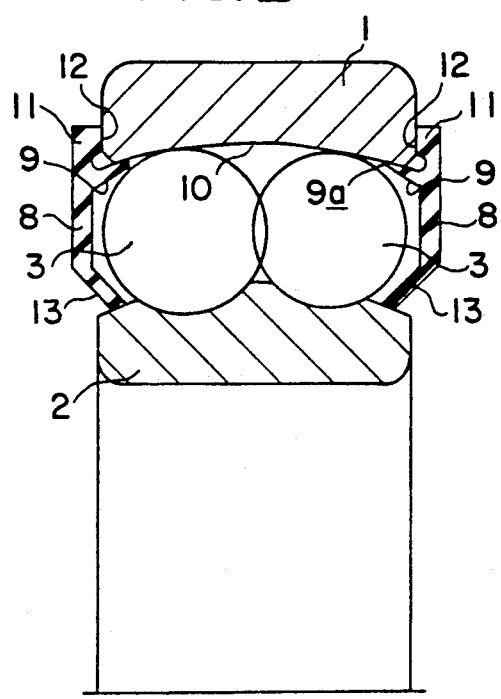
FIGS. 2, 3, 4, 5, 6, 7, 8, and 9 show different embodiments of sealed spherical bearings according to the present invention.
Figure 3:
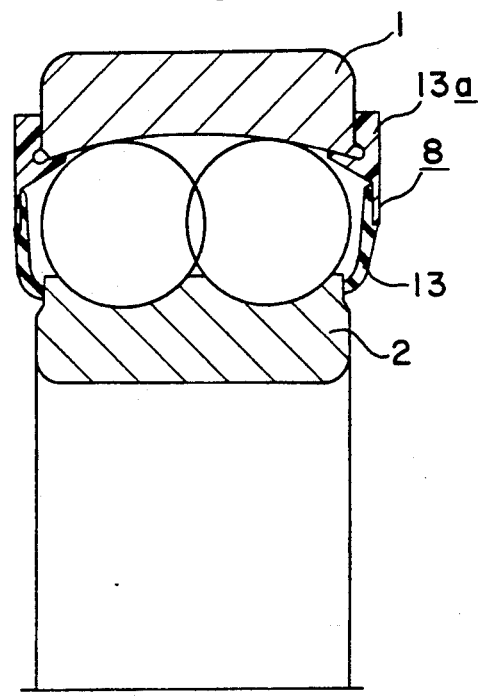

FIG. 3 shows the same type of bearing as FIG. 2, except that the seal 8 is made of two materials, namely plastic in the outer part 13a, and rubber or similar soft material in the inner part 13 which is formed as a sealing lip that frictionally contacts the inner ring 2.

Figure 4:
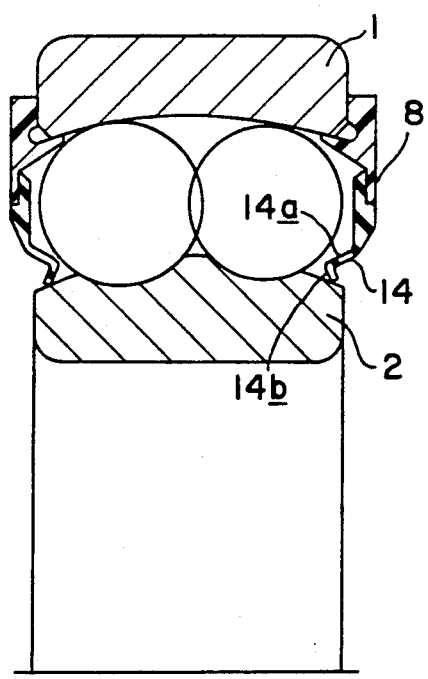

FIG. 4 shows the same bearing and seal as FIG. 3 but with a differently designed inner sealing lip 14 which has an angularly disposed lip 14a and 14b.

Figure 5:
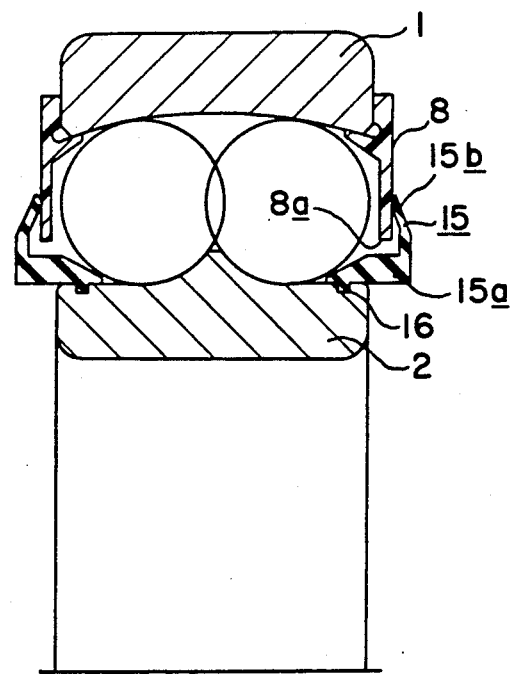
Figure 6:
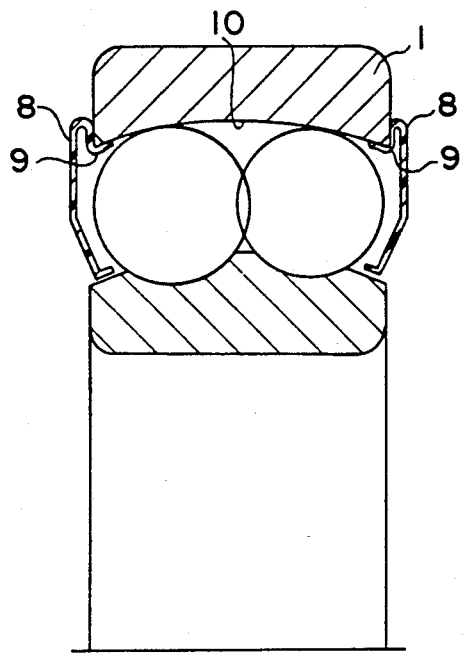
Figure 7:
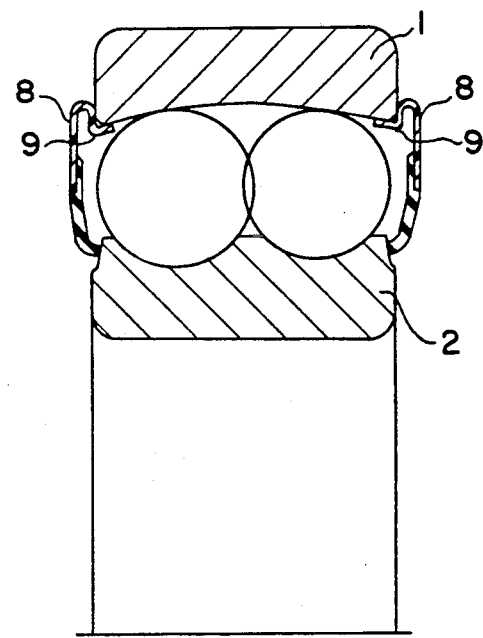
Figure 8:
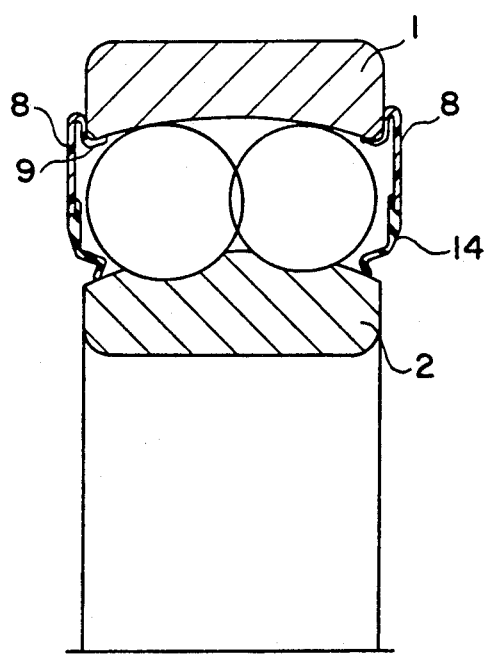
Figure 9:
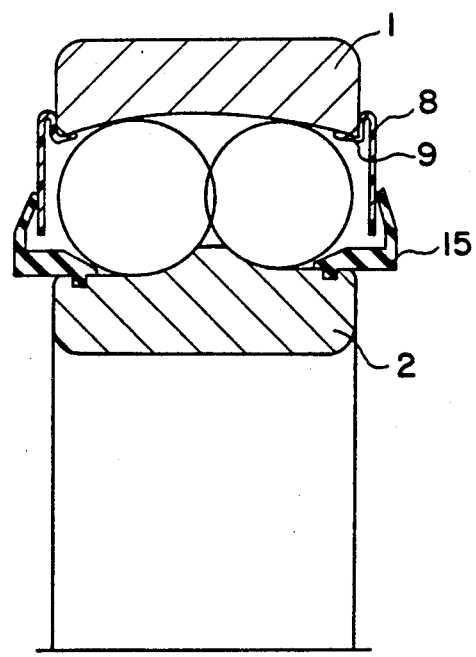

FIG. 5 shows a further embodiment of the present invention applied on the same type of bearing as in the preceding figures. In this case the seal 8 is made in one piece, but it extends only partly down towards the inner ring 2, and then terminates at its inner terminal edge 8a short of the inner ring 2. A second seal 15, of a generally L shaped cross-section, includes an axial leg 15a having a bead 16 which engages in a groove in the inner ring 2. The second seal 15 also includes an upstanding radial leg 15b which projects inwardly to overlap and engage the outer face of the seal 8.

The seal embodiments shown in FIGS. 6, 7, 8 and 9 are generally similar to the embodiments according to FIG. 2-5, respectively, but the seal 8 is now made of sheet metal instead of plastic. Further, the rim 9, which is intended to be snapped in against the spherical race track 10, has been formed by the bending of the sheet metal. The remainder of the seals 8 are similar to the seals 8 in FIGS. 2-5 respectively.

A sealed spherical bearing has been achieved through the present invention which can be used with the same external dimensions as an unsealed spherical bearing. A less expensive design has thus been achieved since a sealed bearing according to known prior art designs had to be broader than those according to the present invention, and are more expensive to manufacture because of the necessity of turning the groove 7 for mounting the seal 5.

Although a particular embodiment of the present invention has been illustrated and described herein, it is not intended to limit the invention and changes and modifications may be made therein within the scope of the following claims.

What is claimed is:

1. A spherical rolling bearing comprising an outer ring (1) with a spherical raceway (10) and side plane (12), an inner ring (2), rolling elements (3) between said outer and inner rings (1,2), and at least one seal (8) at one axial end of said spherical rolling bearing formed with a rim (9) which can be snapped against the spherical raceway (10) and supported in the outer ring (1) by means of rim (9) and a portion (11) which clamps against said side plane (12) of said outer ring (1).

2. A spherical rolling bearing according to claim 1, characterized in that said seal (8) is made in one piece of plastic, rubber or sheet metal and at a radial inner rim (13) of said seal (8), said seal (8) is bent inwardly against said spherical rolling bearing and forms a seal against a surface on said inner ring (2).

3. A spherical rolling bearing according to claim 1, characterized in that said seal (8) consists of plastic or sheet metal at its radial outer part and its inner portion (4) is provided with a lip (14) of rubber or similar soft material, which is intended to contact a surface on said inner ring (2).

4. A spherical rolling bearing according to claim 1, characterized in that said seal (8) extends only partly inwardly against said inner ring (2) and that a lip (15) consisting of soft material mounted on said inner ring (2) contacts the outside of said seal (8).

* * * * *